United States Patent [19]

Lundgren

[11] Patent Number: 4,464,140
[45] Date of Patent: Aug. 7, 1984

[54] TORQUE TRANSMITTING COUPLING

[75] Inventor: Bengt Lundgren, Lerum, Sweden

[73] Assignee: SKF Mekanprodukter AB, Sweden

[21] Appl. No.: 410,048

[22] Filed: Aug. 20, 1982

[30] Foreign Application Priority Data

Sep. 11, 1981 [SE] Sweden ............................ 8105410

[51] Int. Cl.³ .......................... F16B 2/00; F16D 3/48; F16D 3/70
[52] U.S. Cl. ..................................... 464/71; 403/314; 403/370; 464/137
[58] Field of Search ............... 403/314, 370, 371, 374; 464/71, 74, 137, 138, 147, 153, 154

[56] References Cited

U.S. PATENT DOCUMENTS

| | | | |
|---|---|---|---|
| 1,143,054 | 6/1915 | Lloyd | 464/137 |
| 1,482,097 | 1/1924 | Smith | 464/137 |
| 3,905,207 | 9/1975 | Garrison | 464/137 X |
| 4,134,699 | 1/1979 | Schäfer et al. | 403/314 X |
| 4,407,603 | 10/1983 | Lundgren | 403/370 |

FOREIGN PATENT DOCUMENTS

2929859 2/1981 Fed. Rep. of Germany ...... 403/314

Primary Examiner—Stuart S. Levy
Assistant Examiner—Daniel P. Stodola
Attorney, Agent, or Firm—Eugene E. Renz, Jr.

[57] ABSTRACT

The invention refers to a device for torque transmitting interconnection of two shafts (1, 2) or the like. The shafts are at their opposite ends provided with flanges formed as clamping sleeves incorporating inner and outer sleeves (7 and 6 respectively), the inner sleeve of which is clamped against the shaft at a relative axial displacement of the sleeves. Power transmission takes place via a number of axial pegs (5) which extend between recesses in each flange. A part of each recess is situated in each of the inner and outer sleeves whereby a relative rotation of the sleeves is prevented by the pegs, and the resistance of the inner sleeve against clamping is reduced.

1 Claim, 4 Drawing Figures

TORQUE TRANSMITTING COUPLING

The invention refers to a device for torque transmitting interconnection of two shafts or the like, of the type defined in the preamble of claim 1.

Earlier known devices of this type incorporate commonly two angular flanges which are attached to the shaft ends by e.g. splines or keygroves and key whereby a number of pegs, preferably provided with elastic bushings are arranged in opposite axial recesses in the flanges.

A drawback of such devices is that the shaft ends must be given a particular design e.g. they must be provided with splines or keygroves in order to make it possible to mount the flanges. Particular holding devices must furthermore be arranged in connection to the flanges in order to maintain these in desired positions on the different shaft ends. This makes the devices more expensive and it also makes the mounting and dismounting more complicated.

The purpose of the present invention is to provide a device of the above mentioned type, which is easily manufactured, mounted and dismounted, which is safely attached in desired position and which has the ability to transmit big torques even when cylindrical shafts are interconnected.

This is achieved according to the invention thereby that the device has the characteristics defined in claim 1.

The invention will hereinafter be further described with reference to the accompanying drawing in which.

Figure 1:
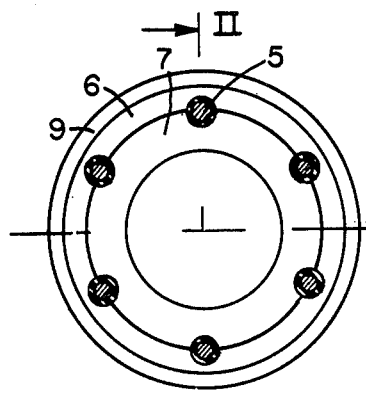
FIG. 1 shows a cross section along line I—I in FIG. 2.
Figure 2:
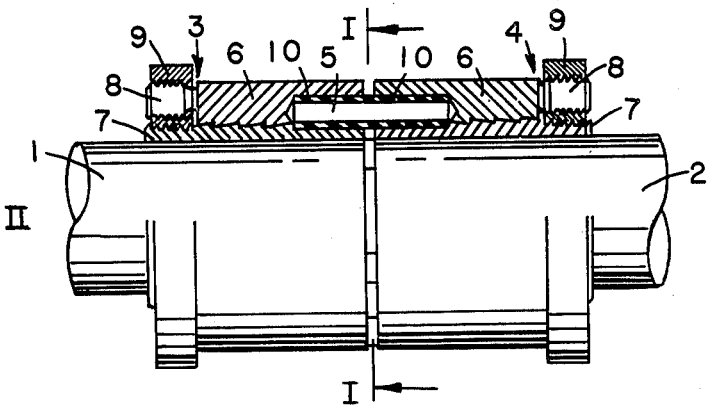
FIG. 2 shows a longitudinal section according to line II—II in FIG. 1 according to one embodiment of the invention.

In FIGS. 1 and 2 are shown two shafts 1, 2 with opposite end portions provided with a flange member 3, 4 each, between which flange members extend a number of axially directed pegs 5 which enter into corresponding recesses. The flange members consist of clamping sleeves of a type known per se in other connections, see for instance the Swedish patent application No. 7909531-1. Such a clamping sleeve incorporates an outer 6 and inner 7 sleeve. These sleeves engage each other along one or more helical flanks on complementary threads having saw-tooth-shaped longitudinal threading die profile. A relative axial displacement of the inner and outer sleeve, effected e.g. by tightening a number of screws 8 arranged around a flange 9 on the inner sleeve and which engage the end surface of the outer sleeve, the inner sleeve 7 will be clamped radially against shaft 1 respectively 2, whereby the friction between the sleeve and the shaft makes it possible to transmit a torque.

The recesses for the pegs 5 in the sleeves 6, 7 are arranged so that a part of each recess is situated in each sleeve. The pege thereby prevent a relative rotation of sleeves 6, 7 above that they transmit torque between shafts 1 and 2. The portions of the pegs inserted in the recesses are according to FIG. 2 enclosed by casings 10 of elastically deformable material e.g. rubber whereby the pegs can be allowed to be tilted in the recesses and thereby it is also possible to allow the shafts 1, 2 to have a certain inclination or excentricity. The casings furthermore ascertain that the power transmission will be smooth and without play.

Figure 3:
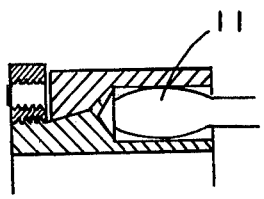
FIGS. 3 and 4 show longitudinal section of portions of other embodiments of the invention.

In FIG. 3 is shown a peg which has been given barrel-shape in its portion 11 inserted in the recess. The use of such pegs allows an angular adjustment of the interconnected shafts as the pegs can be tilted in the recesses.

Figure 4:
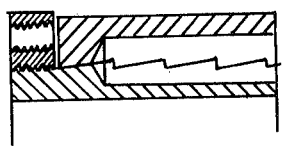

If the recesses such as shown in FIG. 4 are arranged thus that the portions of the recesses situated in the inner sleeve are arranged at a small distance from the inner surface of the sleeve and has an axial extension which mainly corresponds to the length of the clamping portion of the sleeve it is possible that the inner sleeve can be more easily clamped against the shaft as the resistance against deformation in the comparatively thin areas of the inner sleeve situated between the different recesses and the inner surface is small.

Other embodiments of the invention than those described hereabove are of course also possible within the scope of the claims. The pegs can for instance be given other shapes and can be inserted in other manners. They can e.g. be made from a resilient material and can be given a shape which allows a large elastic deformation thus that an elastic power transmission can be obtained. It is also possible to arrange a disc or a ring between the flange members and to allow the pegs to extend between recesses in each flange and in this ring. Pegs of different types can be used in the same device. The relative axial displacement of the outer 6 and the inner 7 sleeve can be brought about in other manners than with screws 8 e.g. in hydraulic manner or with wedge device.

What is claimed is:

1. A device for transmitting torque between at least a pair of shaft members disposed in end-to-end rotation comprising a pair of inner and outer sleeve members circumscribing each shaft member and the inner and outer sleeve members having complementary confronting axial surfaces having thread means defining a saw-tooth profile, means for effecting relative axial displacement of the inner and outer sleeve members to produce a clamping action against said shaft members, means defining corresponding recesses in the confronting radial faces of said inner and outer sleeve members of each pair, a portion of each recess being formed in the axial confronting surfaces of said inner and outer sleeve members and a peg mounted in said corresponding recesses bridging said pairs of inner and outer sleeve members to transmit torque between said pair of shaft members.

* * * * *